United States Patent
Mao et al.

(10) Patent No.: US 8,717,717 B2
(45) Date of Patent: May 6, 2014

(54) HIGH EFFICIENCY POWER REGULATOR AND METHOD

(75) Inventors: Hengchun Mao, Plano, TX (US); Yan-Fei Liu, Kingston (CA); Renhua Wu, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 6 days.

(21) Appl. No.: 13/198,178

(22) Filed: Aug. 4, 2011

(65) Prior Publication Data

US 2013/0033786 A1 Feb. 7, 2013

(51) Int. Cl.
*H02H 3/22* (2006.01)

(52) U.S. Cl.
USPC ............................................. 361/18; 361/111

(58) Field of Classification Search
USPC .................................... 361/18, 111
See application file for complete search history.

(56) References Cited

U.S. PATENT DOCUMENTS

| | | | | |
|---|---|---|---|---|
| 6,166,527 | A * | 12/2000 | Dwelley et al. | 323/222 |
| 2002/0047634 | A1* | 4/2002 | Ito et al. | 315/291 |
| 2008/0303502 | A1* | 12/2008 | Haiplik | 323/283 |
| 2012/0313595 | A1* | 12/2012 | Mao et al. | 323/271 |

FOREIGN PATENT DOCUMENTS

| | | |
|---|---|---|
| CN | 1787314 A | 6/2006 |
| CN | 201174586 Y | 12/2008 |
| CN | 101656418 A | 2/2010 |
| JP | 2004023965 A | 1/2004 |
| WO | WO 00-05798 | 2/2000 |

OTHER PUBLICATIONS

International Search Report and Written Opinion of Patent Cooperation Treaty, International Application No. PCT/CN2012/079736, Applicant Huawei Technologies Co., Ltd., et al., date of mailing Nov. 15, 2012, 11 pages.

* cited by examiner

*Primary Examiner* — Danny Nguyen
(74) *Attorney, Agent, or Firm* — Slater & Matsil, L.L.P.

(57) ABSTRACT

An embodiment high efficiency power regulator comprises a three-terminal converter and a protection device. The three-terminal converter comprises a first terminal coupled to a positive terminal of an input voltage bus, a second terminal coupled to a positive terminal of an output voltage bus and a third terminal coupled to the protection device. The protection device comprises an inrush current limiting element connected in series with a reverse polarity protection device.

21 Claims, 8 Drawing Sheets

HIGH EFFICIENCY POWER REGULATOR AND METHOD

TECHNICAL FIELD

The present invention relates to devices and methods for non-isolated dc-dc power regulators, and more particularly, to devices and methods for non-isolated dc-dc regulators comprising a protection or control device.

BACKGROUND

A telecommunication network power system usually includes an ac-dc stage converting the power from the ac utility line to a 48V dc distribution bus and a dc-dc stage converting the 48V dc distribution bus to a plurality of voltage levels for all types of telecommunication loads. Alternatively, the 48V dc distribution bus may be converted into a low voltage bus through an isolated dc-dc converter. Furthermore, a plurality of downstream non-isolated dc-dc converters with inputs coupled to the low voltage bus may generate a variety of voltage levels in accordance with the needs of the telecommunication network power system. Usually, the dc distribution bus may have a relatively wide voltage rang. For example, the dc distribution bus may have a range from 36V to 75V in a normal operation mode. During a transient, the dc distribution bus' transient voltage is usually up to 100V.

To achieve an optimized distributed power system, one or more non-isolated power converters may be used to reduce the range variation of the distribution bus voltage. The non-isolated dc-dc converters can be implemented by using different power topologies, such as buck dc-dc converters, boost dc-dc converters, buck-boost dc-dc converters, linear regulators and/or the like.

In order to have a reliable telecommunication power system, a variety of protection devices may be connected in series with non-isolated dc-dc converters to form non-isolated dc-dc regulators. For example, an inrush current limiting device such as an n-type metal oxide semiconductor (NMOS) transistor may be placed between an input voltage bus and a buck dc-dc converter. When the buck dc-dc converter is plugged into the input voltage bus, the inrush current limiting device helps to reduce the current flowing into the dc-dc converter by slowly turning on the NMOS transistor. Likewise, a reverse polarity protection device may be connected in series with a dc-dc converter. The reverse polarity protection device helps to prevent a current flowing into the dc-dc converter when reverse polarity occurs. Conventionally, these protection switches are placed in the main power path of the dc-dc converter. As a result, the protection switches may endure full voltage and current stresses of the dc-dc converter. Such full voltage and current stresses may cause extra power losses in the dc-dc converter.

SUMMARY OF THE INVENTION

These and other problems are generally solved or circumvented, and technical advantages are generally achieved, by preferred embodiments of the present invention which provide a system, structure and method for achieving a high efficiency non-isolated dc-dc switching regulator.

In accordance with an embodiment, a system comprises a three-terminal converter and a protection device. The three-terminal converter comprises a first terminal coupled to an input voltage bus, a second terminal coupled to an output voltage bus and a third terminal coupled to a first terminal of a protection device. The protection device comprises an inrush current limiting element and a reverse polarity protection element.

In accordance with another embodiment, a regulator comprises a first switching element, an input capacitor coupled between a positive terminal of an input voltage bus and a return point, an output capacitor coupled between a positive terminal of an output voltage bus and the return point and a protection device coupled between the return point and a common return point of the input voltage bus and the output voltage bus.

In accordance with yet another embodiment, a method comprises connecting a first terminal of a three-terminal converter to a positive terminal of an input voltage bus, connecting a second terminal of the three-terminal converter to a positive terminal of an output voltage bus, connecting a third terminal of the three-terminal converter to a first terminal of a protection device and connecting a second terminal of the protection device to a common return of the input voltage bus and the output voltage bus.

An advantage of an embodiment of the present invention is reducing the size and power loss of a dc-dc regulator so as to improve the efficiency, reliability and cost of a power system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a high efficiency buck dc-dc converter. The invention may also be applied, however, to a variety of dc-dc converters including buck dc-dc converters, boost dc-dc converters, buck-boost dc-dc converters, flyback converters, forward converters, half bridge and full bridge converters and the like.

Figure 1:
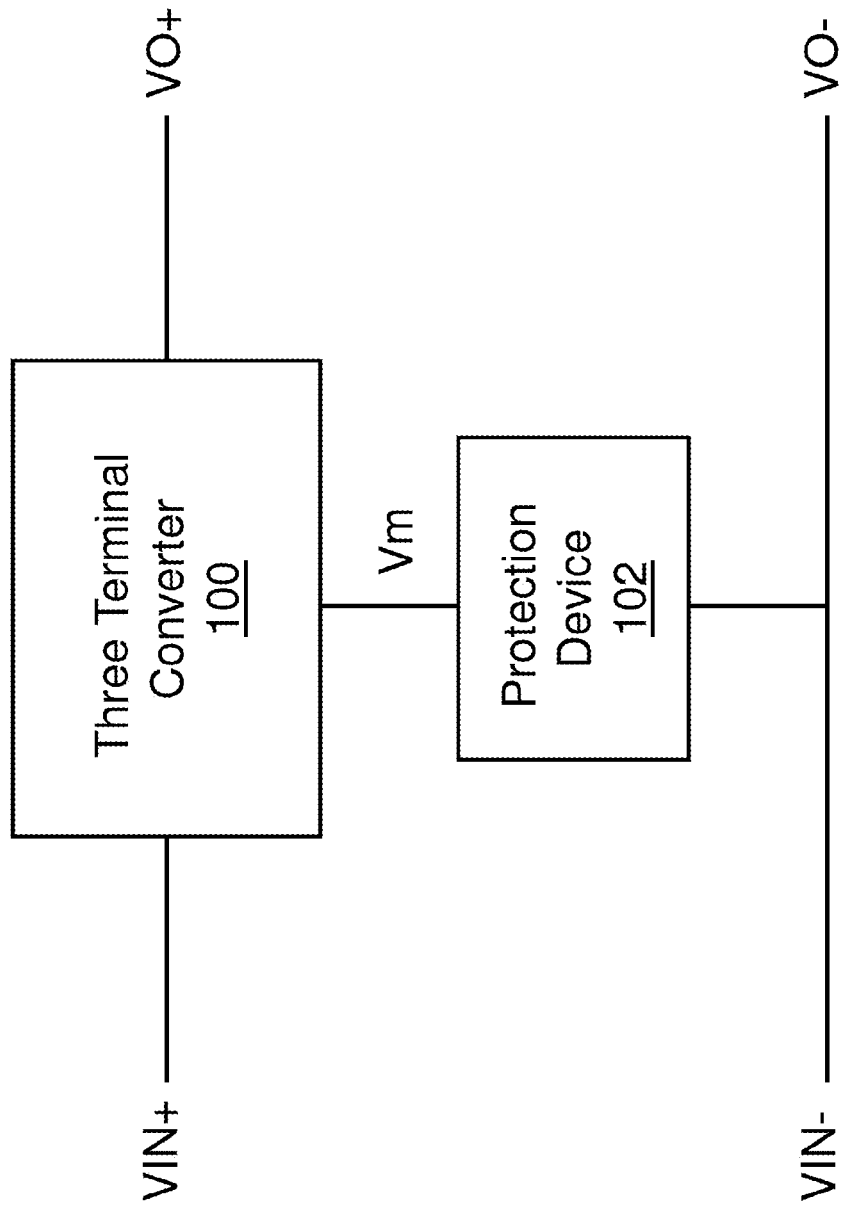
FIG. 1 illustrates a block diagram of a high efficiency power regulator in accordance with an embodiment.

Referring initially to FIG. 1, a block diagram of a high efficiency power regulator is illustrated in accordance with an embodiment. The high efficiency power regulator comprises a three-terminal converter 100 and a protection device 102. The three-terminal converter 100 may be part of non-isolated regulators including buck dc-dc converters, boost dc-dc converters, buck-boost dc-dc converters and the like. The protection device 102 may comprise a variety of power supply protection functions such as inrush current limiting, reverse polarity protection and the like. The three-terminal converter 100 has a first terminal coupled to a positive terminal of an input voltage bus, a second terminal coupled to a positive terminal of an output voltage bus and a third terminal coupled to an intermediate point Vm as well as a terminal of the protection device 102. As shown in FIG. 1, the other terminal of the protection device 102 is coupled to both a negative terminal of the input voltage bus and a negative terminal of the output voltage bus. In accordance with an embodiment, both the negative terminal of the input voltage bus and the negative terminal of the output voltage bus may be further coupled to ground. One advantageous feature of having the protection device 102 coupled between the intermediate point Vm and ground is that the current stress as well as the power losses at the protection device 102 may be reduced so that the efficiency of the power converter shown in FIG. 1 can be improved.

Figure 2:
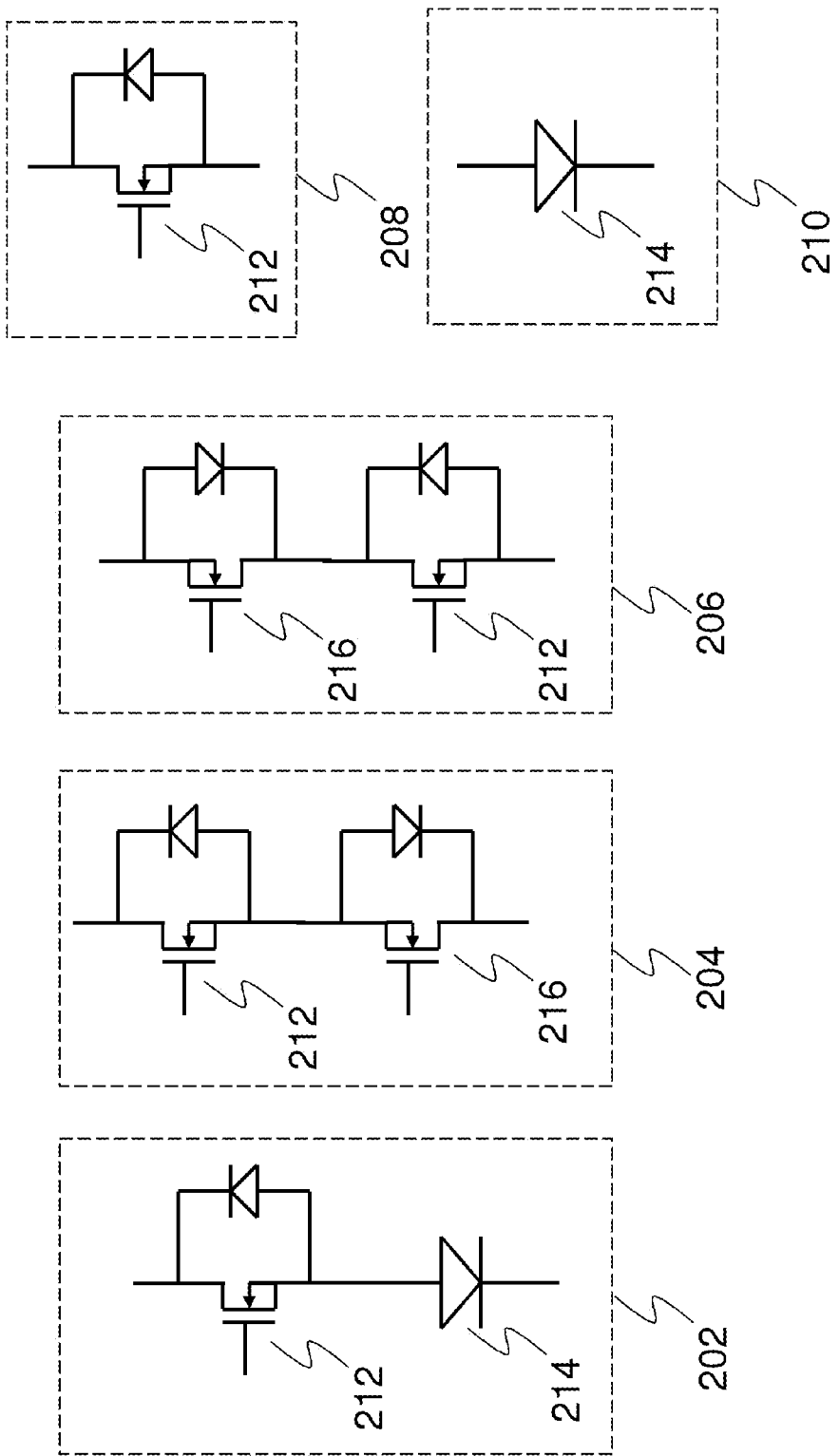
FIG. 2 illustrates five embodiments of the protection device 102 shown in FIG. 1.

FIG. 2 illustrates five embodiments of the protection device 102 shown in FIG. 1. A first protection device 202 comprises a first n-type metal oxide semiconductor (NMOS) transistor 212 and a diode 214 connected in series. As shown in FIG. 2, the source of the first NMOS transistor 212 is connected to the anode of the diode 214. The NMOS transistor 212 and the diode 214 connected in series form a protection device for a three-terminal regulator (illustrated in FIG. 1). More particularly, the diode 214 may provide reverse polarity protection and the first NMOS transistor 212 may be used as an inrush current limiting device.

The NMOS transistor 212 functions as a slow start switch controlled by a controller (not shown). When an input voltage is suddenly applied to a power regulator, the NMOS transistor 212 connected between the input voltage and the power converter may be turned on slowly. As a result, the current flowing through the NMOS transistor 212 ramps up slowly so that the input voltage of the power converter increases slowly to its normal voltage. It should be noted that while FIG. 2 shows the protection device 202 employs an NMOS transistor 212 as a current limiting element, one of ordinary skill in the art would recognize many variations, alternatives, and modifications. For example, the protection device 202 may employ other and alternate embodiment current limiting elements, such as negative temperature coefficient (NTC) thermistors, fixed resistors and the like.

The protection device 202 further comprises a reverse polarity protection element. As known in the art, a diode may allow an electric current to pass in forward direction, while preventing the electric current from flowing in the opposite direction. As such, when a power converter is plugged into an input voltage bus with reverse polarity, the protection device 202 comprising the diode 214 may prevent an electric current from flowing into the power converter so as to keep the reverse voltage applied to the input of the power converter from damaging the internal circuits of the power converter.

Alternatively, the diode 214 of the protection device 202 can be replaced by a second NMOS transistor 216 shown in the protection device 204. The second NMOS transistor 216 can be used as a series diode by turning off the second NMOS transistor 216. On the other hand, when the series diode operates in a forward conduction mode, the turned on NMOS transistor 216 may reduce the voltage drop across the protection device 204. An advantageous feature of replacing a series diode with an NMOS transistor is that the turned on voltage drop across an NMOS transistor is much less than that of a series diode. As a result, the efficiency of the power protection device can be further improved. It should be noted while FIG. 2 shows using an NMOS transistor 216 to replace the series diode 214, one skilled in the art will recognize that the NMOS transistor 216 illustrated in FIG. 2 is simply one embodiment and that other devices can be employed. For example, the series diode 214 can be replaced by a p-type metal oxide semiconductor (PMOS) transistor.

The protection device 206 shown in FIG. 2 is an alternative embodiment of the protection device 204. The protection device 206 can be formed by swapping the first NMOS transistor 212 and the second NMOS transistor 216 of the protection device 204. It should be noted that there may be various embodiments for achieving the same functions provided by the protection device 206. For example, both the first NMOS transistor 212 and the second NMOS transistor 216 can be replaced by PMOS transistors. In addition, either the first NMOS transistor 212 or the second NMOS transistor 216 can be replaced by a plurality of transistors connected in series or in parallel.

FIG. 2 further illustrates a fourth protection device 208 and a fifth protection device 210. As shown in FIG. 2, the fourth protection device 208 comprises the first NMOS transistor 212. Likewise, the fifth protection device 210 comprises the diode 214. It should be noted that in accordance with an embodiment, a protection device (e.g., protection device 202) may comprise an NMOS transistor and a diode connected in series. However, a protection device having two component connected in series is merely an example, which should not unduly limit the scope of the claims. One of ordinary skill in the art would recognize many variations, alternatives, and modifications. For example, a power regulator may employ a protection device comprising a diode (e.g., protection device 210) or an NMOS transistor (e.g., protection device 208). The number of components in a protection device is limited solely for the purpose of clearly illustrating the inventive aspects of the various embodiments. The present invention is not limited to any specific number of components in a protection device.

Figure 3:
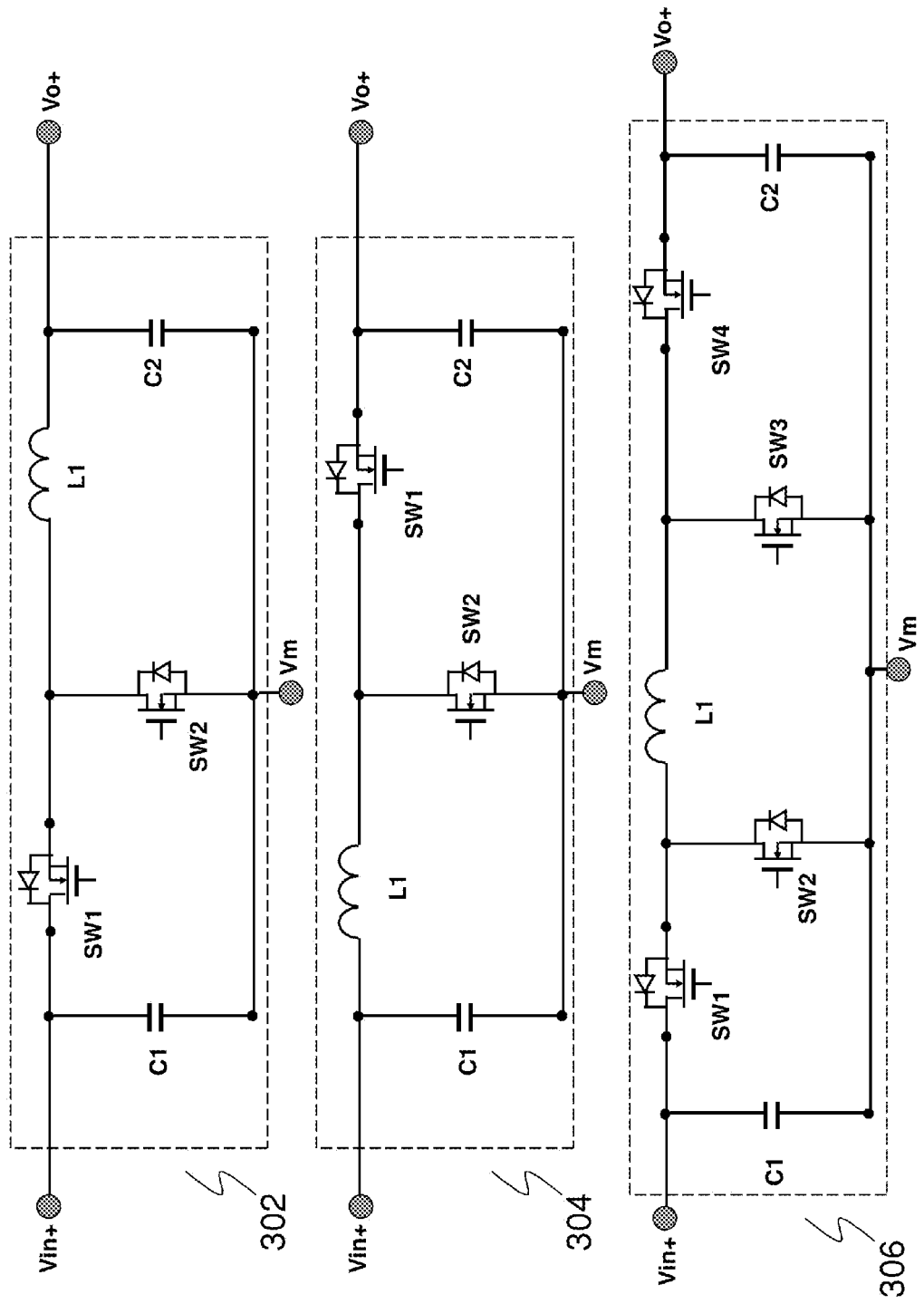
FIG. 3 illustrates three embodiments of the three-terminal converter 100 shown in FIG. 1.

FIG. 3 illustrates three embodiments of the three-terminal converter 100 shown in FIG. 1. The first three-terminal converter 302 is a buck dc-dc converter comprising a first NMOS transistor SW1, a second NMOS transistor SW2, an input capacitor C1, an output capacitor C2 and an output inductor L1. The operation principles of a buck dc-dc converter are well known in the art, and hence are not discussed in further detail herein. The second three-terminal converter 304 is a boost dc-dc converter comprising a first NMOS transistor SW1, a second NMOS transistor SW2, an input capacitor C1, an output capacitor C2 and an output inductor L1. The boost dc-dc converter 304 is used to provide an output voltage higher than an input voltage by modulating the width of a pulse applied to the first NMOS transistor SW1. The operation principles of the boost dc-dc converter are well known in the art, and hence are not discussed in further detail herein.

The third three-terminal converter 306 is a buck-boost dc-dc converter comprising a buck dc-dc converter plus a boost dc-dc converter. More particularly, when the buck-boost dc-dc converter 306 operates in a step-up mode, the first NMOS transistor SW1 is turned on and the second NMOS transistor SW2 is turned off. As a result, the inductor L1, the third NMOS transistor SW3 and the fourth NMOS transistor SW4 form a boost dc-dc converter having the same system configuration as that of the boost dc-dc converter 304. On the other hand, when the buck-boost dc-dc converter operates in a step-down mode, the fourth NMOS transistor SW4 is turned on and the third NMOS transistor SW3 is turned off. As a result, the first NMOS transistor SW1 and the second NMOS transistor SW2 and the inductor L1 form a buck dc-dc converter having the same system configuration as that of the buck dc-dc converter 302.

Figure 4:
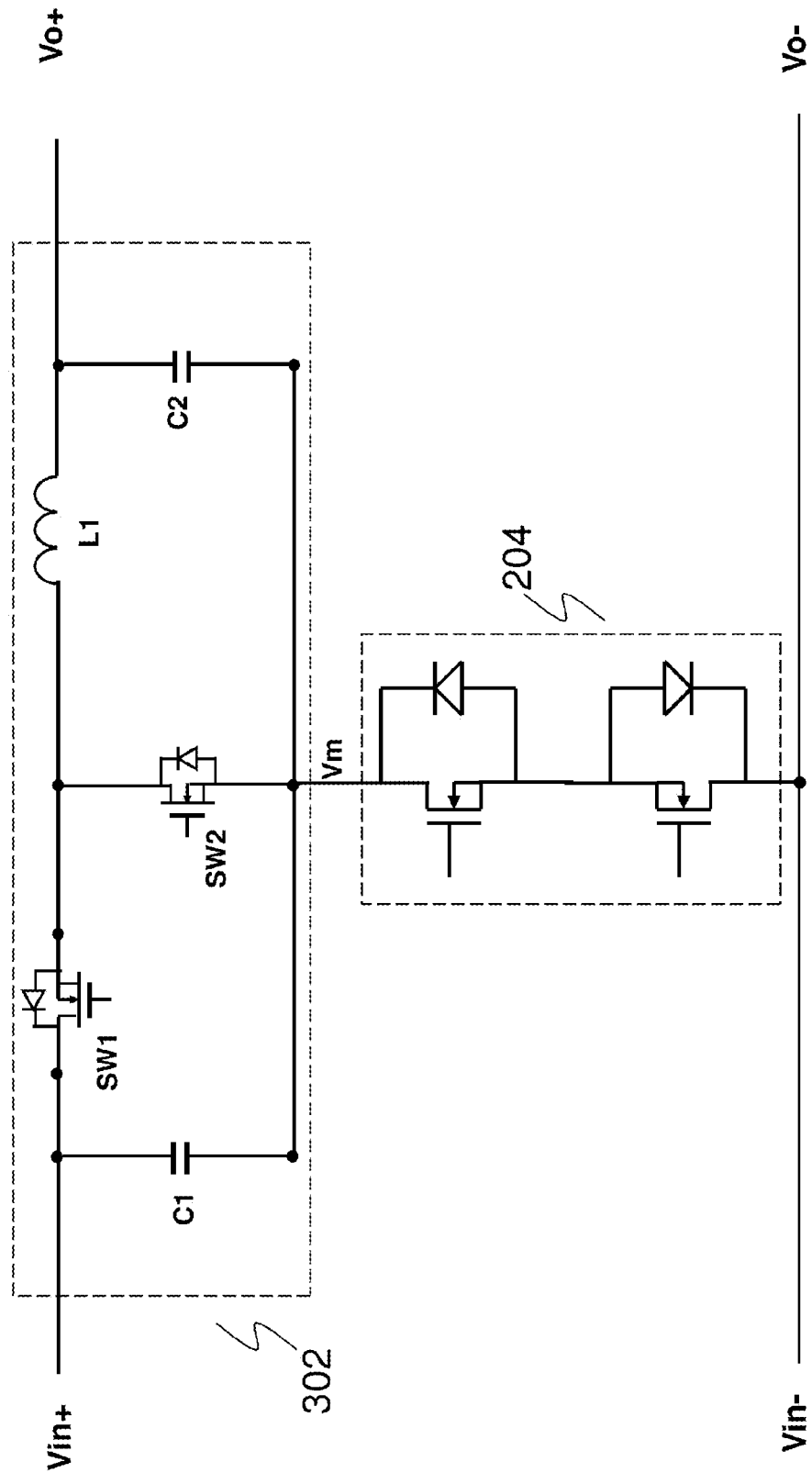
FIG. 4 illustrates a schematic diagram of a three-terminal buck dc-dc converter and a protection device in accordance with an embodiment.

FIG. 4 illustrates a schematic diagram of a three-terminal buck dc-dc converter and a protection device in accordance with an embodiment. As known in the art, in accordance with the operation principles of buck dc-dc converters, the high side switch and the low side switch operate in a complementary mode. The ratio of the conduction time of the high side switch over the switching period of a buck dc-dc converter is referred to as the duty cycle of the buck dc-dc converter. The duty cycle is set by a PWM controller or the like. To maintain the output voltage at a predetermined voltage, when the output voltage drops below the predetermined voltage, the high side switch is turned on and the low side switch is turned off so that the output capacitor is charged from the input through the turned on high side switch and the output inductor. On the other hand, when the output voltage exceeds the predetermined voltage, the PWM controller turns off the high switch and turns on the low side switch so that the output voltage is discharged to ground through the turned on low side switch and the output inductor. As a result, the electronic circuits coupled to the buck dc-dc converter can receive a constant output voltage under load and temperature fluctuations.

In steady state operation of a buck converter, the input dc current flowing into the Vin+ terminal is equal to the product of the current flowing out of the Vo+ terminal and the duty cycle of the first NMOS transistor SW1. As shown in FIG. 4, the current flowing through the protection device 204 (from bottom to top) in steady state operation is the difference between the output current flowing out of the Vo+ terminal and the input current flowing into the Vin+ terminal. When the output voltage is close to the input voltage of the buck dc-dc converter 302, the duty cycle of the first NMOS transistor SW1 is relatively high as a result. Therefore, the output current flowing out of the Vo+ terminal is not much different from the input current flowing into the Vin+ terminal. As such, the current flowing through the protection device 204 is much lower than the input current flowing into the Vin+ terminal. As a result, the current stress as well as the power loss of the protection device 204 is reduced. In sum, an advantageous feature of having a protection device 202 as shown in FIG. 4 is that the efficiency of a power regulator can be improved by reducing the power loss at the protection device 204.

Figure 5:
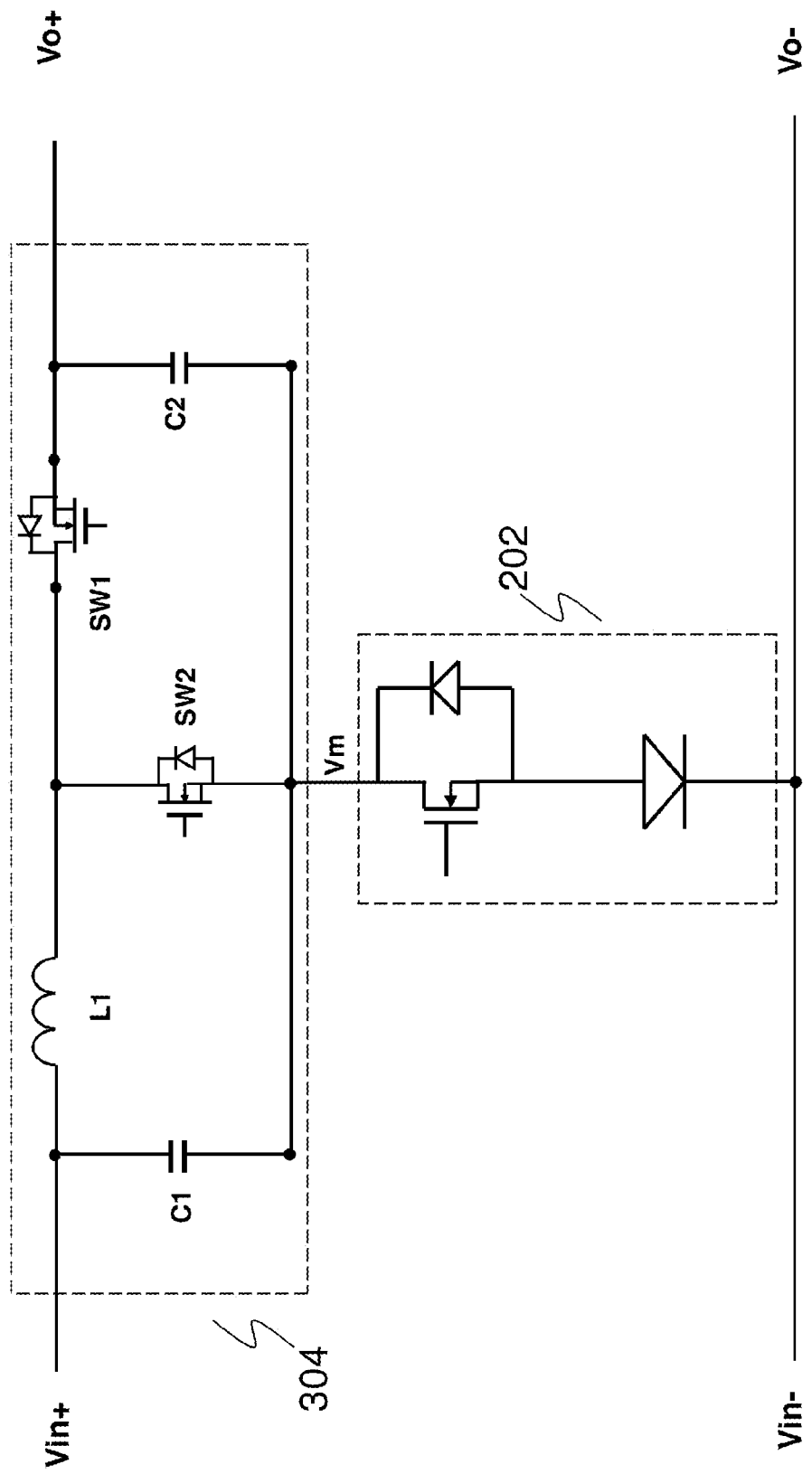
FIG. 5 illustrates a schematic diagram of a three-terminal boost dc-dc converter and a protection device in accordance with another embodiment.

FIG. 5 illustrates a schematic diagram of a three-terminal boost dc-dc converter and a protection device in accordance with another embodiment. Similar to that of FIG. 4, when the boost dc-dc converter 304 operates in a high duty cycle mode, the protection device 202 may experience a lower current value in comparison with the power architecture having a protection device connected in series with the boost dc-dc converter 304. As a result, the power loss of the protection device 202 may be reduced.

Figure 6:
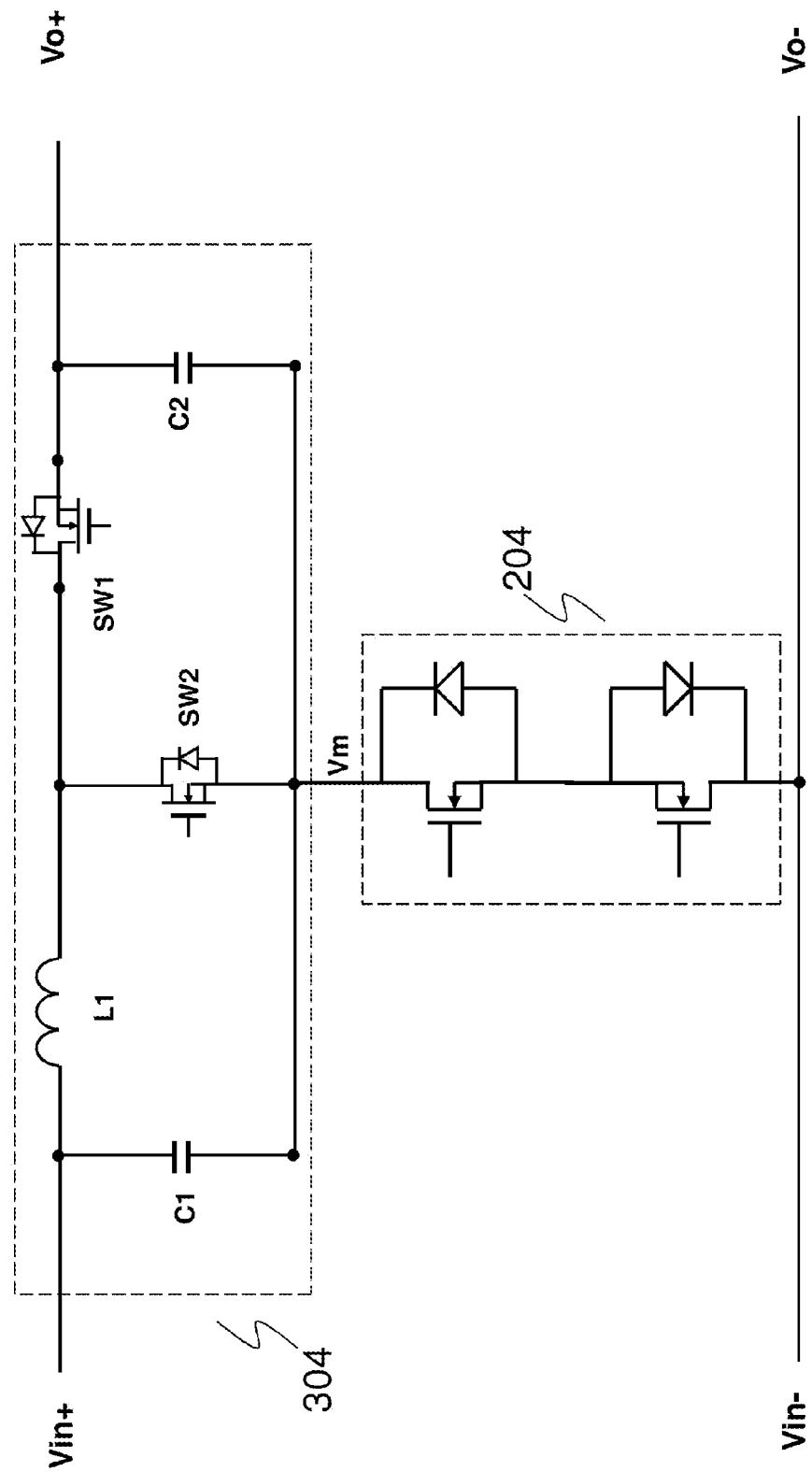
FIG. 6 illustrates a schematic diagram of a three-terminal boost dc-dc converter and a protection device in accordance with yet another embodiment.

FIG. 6 illustrates a schematic diagram of a three-terminal boost dc-dc converter and a protection device in accordance with yet another embodiment. The system configuration of FIG. 6 is similar to that of FIG. 5 except that the protection device 202 is replaced by the protection device 204. One skilled in the art will recognize that the protection device 202 can also be replaced by the protection device 206 shown in FIG. 2. Any combinations between protection devices shown in FIG. 2 and the three-terminal regulators shown in FIG. 3 are within the scope of the present invention.

Figure 7:
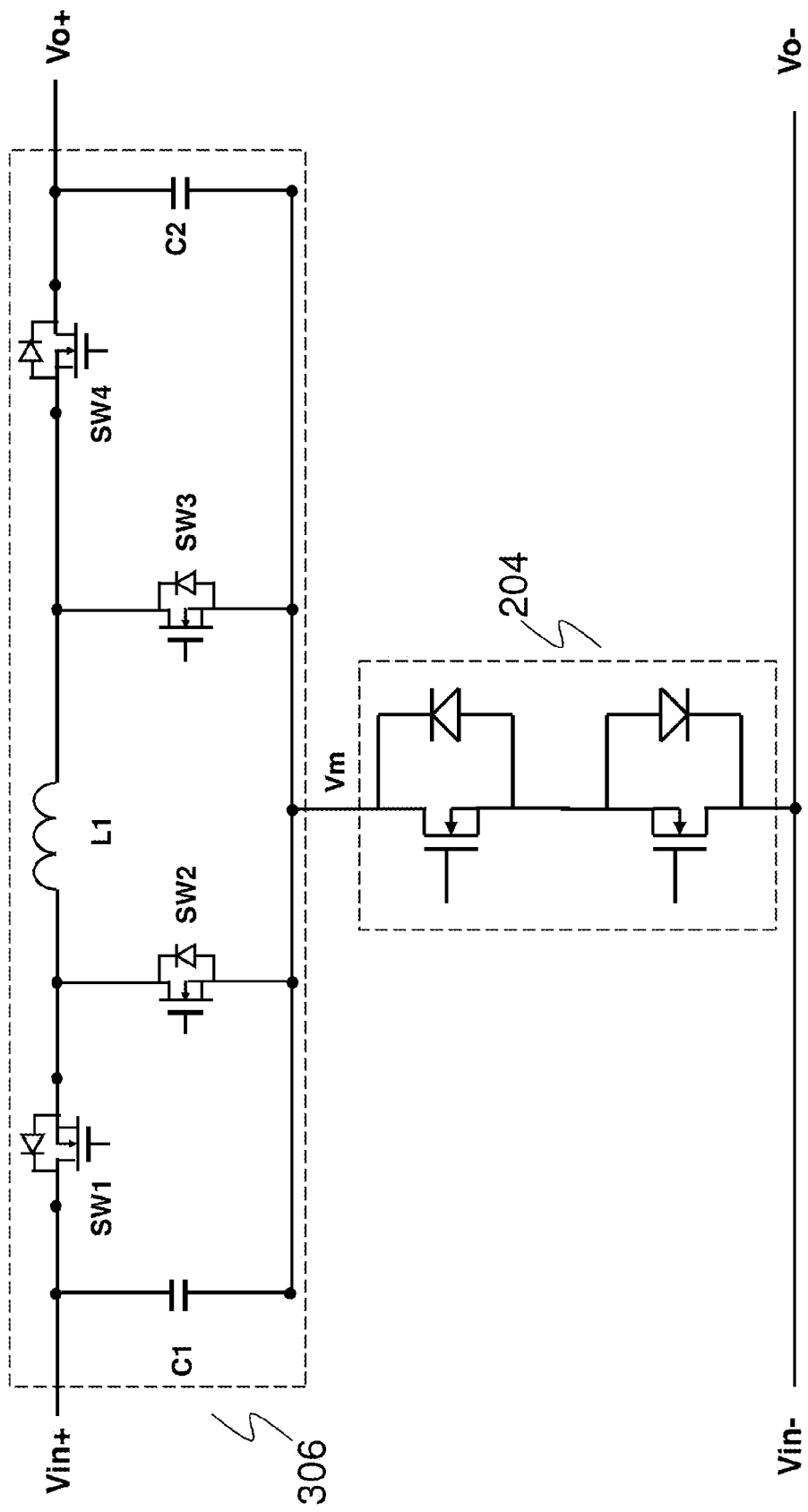
FIG. 7 illustrates a schematic diagram of a three-terminal buck-boost dc-dc converter and a protection device in accordance with yet another embodiment.

FIG. 7 illustrates a schematic diagram of a three-terminal buck-boost dc-dc converter and a protection device in accordance with yet another embodiment. When the buck-boost dc-dc converter 306 operates in a buck dc-dc converter mode with a high duty cycle, the protection device 204 may experience a low RMS current value in comparison with the power architecture having a protection device connected in series with the buck-boost dc-dc converter 306. Likewise, when the buck-boost dc-dc converter 306 operates in a boost dc-dc converter mode with a high duty, the protection device 204 may experience a lower current value in comparison with the power architecture having a protection device connected in series with the buck-boost dc-dc converter 306. As a result, the total efficiency of the buck-boost dc-dc converter 306 may be improved.

Figure 8:
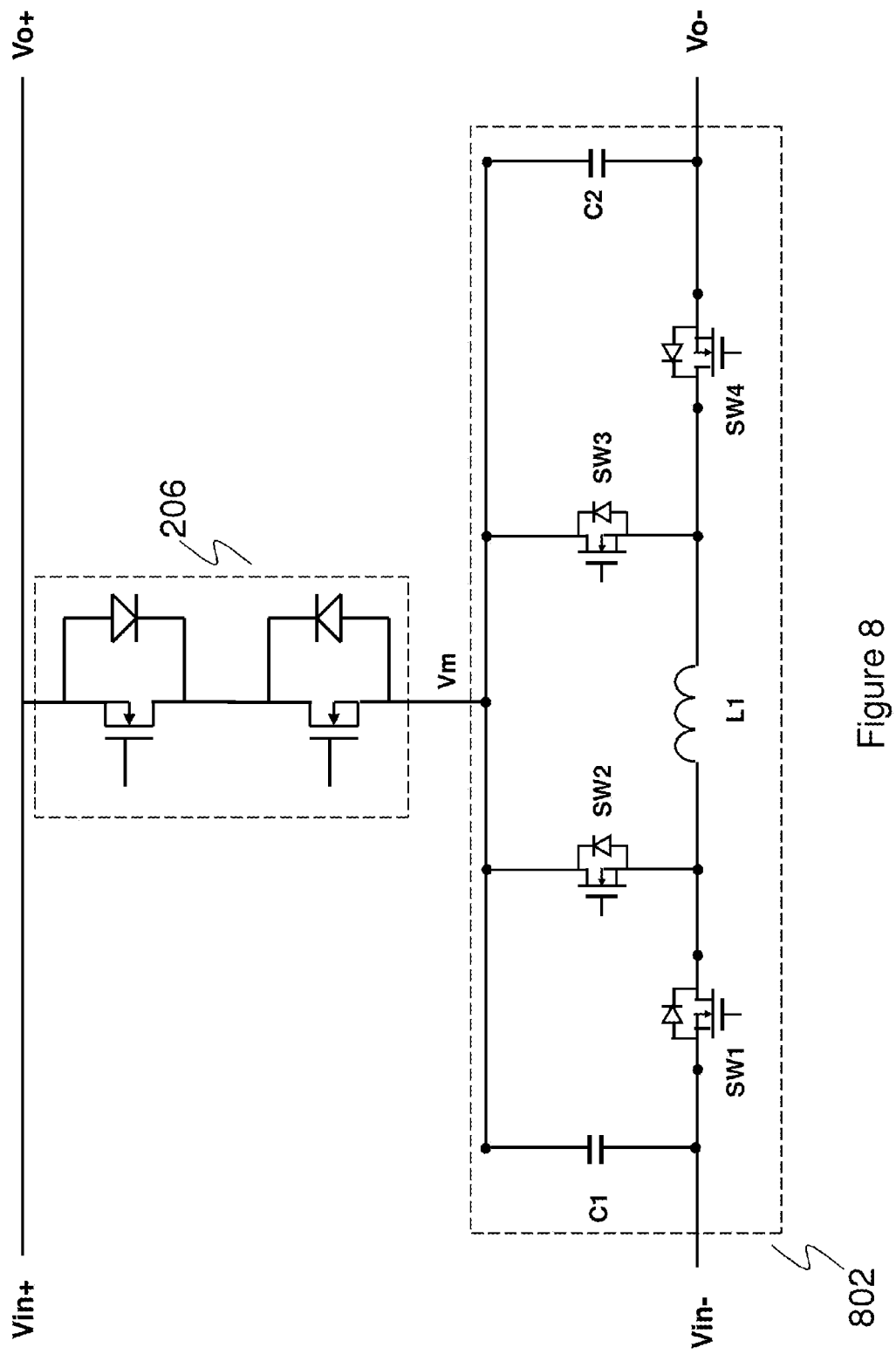
FIG. 8 illustrates a schematic diagram of a three-terminal buck-boost dc-dc converter and a protection device in accordance with yet another embodiment.

FIG. 8 illustrates a schematic diagram of a three-terminal buck-boost dc-dc converter and a protection device in accordance with yet another embodiment. The system configuration of the buck-boost dc-dc converter 802 is similar to that of the buck-boost dc-dc converter 306 shown in FIG. 7 except that the buck-boost dc-dc converter 802 is connected with a negative power system. More particularly, the common return of both the input and the output has a higher voltage than either the input or the output. The operation principles of a negative power system are well known in the art, and hence are not discussed in detail to avoid repetition. An advantageous feature of having the protection device 206 connected between the common return and the intermediate point Vm is that the power loss of the protection device may be reduced when the buck-boost dc-dc converter operates in a high duty cycle mode.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
   a three-terminal converter comprising:
      a first terminal coupled to an input voltage bus;
      a second terminal coupled to an output voltage bus; and
      a third terminal coupled to a first terminal of a protection device; and
   the protection device, wherein a portion of an output current of the output voltage bus is configured to flow through the protection device, and wherein the protection device comprises an inrush current limiting element and a reverse polarity protection element.

2. The system of claim 1, wherein the inrush current limiting element is connected in series with the reverse polarity protection element.

3. The system of claim 1, wherein the inrush current limiting element is an n-type metal oxide semiconductor (NMOS) transistor.

4. The system of claim 1, wherein the inrush current limiting element is a p-type metal oxide semiconductor (PMOS) transistor.

5. The system of claim 1, wherein the reverse polarity protection element is an NMOS transistor.

6. The system of claim 1, wherein the reverse polarity protection element is a PMOS transistor.

7. The system of claim 1, wherein the reverse polarity protection element is a diode.

8. The system of claim 1, wherein the three-terminal converter is a buck dc-dc converter.

9. The system of claim 1, wherein the three-terminal converter is a boost dc-dc converter.

10. The system of claim 1, wherein the three-terminal converter is a buck-boost dc-dc converter.

11. The system of claim 1, wherein the three-terminal converter is a dc-dc converter configured to operate with negative power, the system comprising:
   the protection device coupled between a common return of the input voltage bus and the output voltage bus, and an intermediate point; and
   the dc-dc converter comprising:
      the first terminal coupled to a negative terminal of the input voltage bus;
      the second terminal coupled to a negative terminal of the output voltage bus; and
      the third terminal coupled to the intermediate point.

12. The system of claim 1, wherein the three-terminal converter is a dc-dc converter configured to operate with positive power, the system comprising:
   the protection device coupled between a common return of the input voltage bus and the output voltage bus, and an intermediate point; and
   the dc-dc converter comprising:
      the first terminal coupled to a positive terminal of the input voltage bus;
      the second terminal coupled to a positive terminal of the output voltage bus; and
      the third terminal coupled to the intermediate point.

13. A regulator comprising:
   a first switching element;
   an input capacitor coupled between a positive terminal of an input voltage bus and a return point;
   an output capacitor coupled between a positive terminal of an output voltage bus and the return point; and
   a protection device coupled between the return point and a common return point of the input voltage bus and the output voltage bus, wherein a portion of an output current of the output voltage bus is configured to flow through the protection device, and wherein the protection device comprises an inrush current limiting element and a reverse polarity protection element.

14. The regulator of claim 13, further comprising a second switching element and an inductor, wherein:
   the first switching element is coupled between the positive terminal of the input voltage bus and a phase point of the regulator;
   the second switching element is coupled between the phase point of the regulator and the return point; and
   the inductor is coupled between the phase point of the regulator and the positive terminal the output voltage bus.

15. The regulator of claim 13, further comprising a second switching element and an inductor, wherein:
   the inductor is coupled between the positive terminal the input voltage bus and a phase point of the regulator;
   the first switching element is coupled between the positive terminal of the output voltage bus and the phase point of the regulator; and
   the second switching element is coupled between the phase point of the regulator and the return point.

16. The regulator of claim 13, further comprising a second switching element, a third switching element, a fourth switching element and an inductor, wherein:
   the first switching element is coupled between the positive terminal of the input voltage bus and a first phase point of the regulator;
   the second switching element is coupled between the first phase point of the regulator and the return point;
   the inductor is coupled between the first phase point and a second phase point;
   the third switching element is coupled between the second phase point of the regulator and the return point; and
   the fourth switching element is coupled between the positive terminal of the output voltage bus and the second phase point of the regulator.

17. A method comprising:
   connecting a first terminal of a three-terminal converter to a positive terminal of an input voltage bus;
   connecting a second terminal of the three-terminal converter to a positive terminal of an output voltage bus;
   connecting a third terminal of the three-terminal converter to a first terminal of a protection device, wherein a portion of an output current of the output voltage bus is configured to flow through the protection device, and wherein the protection device comprises an inrush current limiting element and a reverse polarity protection element; and
   connecting a second terminal of the protection device to a common return of the input voltage bus and the output voltage bus.

18. The method of claim 17, further comprising:
   connecting an inrush current limiting device between the first terminal of the protection device and a junction point of the protection device; and
   connecting a reverse polarity protection device between the junction point and the second terminal of the protection device.

19. The method of claim 18, wherein the inrush current limiting is a first n-type metal oxide semiconductor (NMOS) transistor, the method further comprising:
  configuring a gate voltage of the first NMOS transistor such that:
    the first NMOS transistor is slowly turned on when a surge voltage is applied to the input voltage bus; and
    the first NMOS transistor is fully turned on when a steady voltage is applied to the input voltage bus.

20. The method of claim 18, wherein the reverse polarity protection device is a second NMOS transistor, the method further comprising:
  configuring a gate voltage of the second NMOS transistor such that:
    the second NMOS transistor allows a current to flow through the second NMOS transistor when a positive lead of the three-terminal converter is coupled to a positive terminal the input voltage; and
    the second NMOS transistor prevents a current from flowing through the second NMOS transistor when a positive lead of the three-terminal converter is coupled to a negative terminal the input voltage.

21. The method of claim 17, further comprising:
  configuring the three-terminal converter such that the three-terminal converter operates in a high duty cycle mode.

\* \* \* \* \*